Dec. 31, 1963   J. L. LAYTON, JR   3,115,961
SORTING AND DISTRIBUTING DEVICE
Filed May 19, 1961
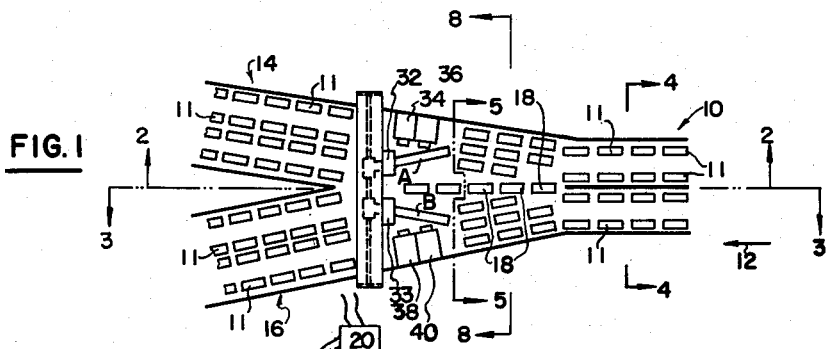
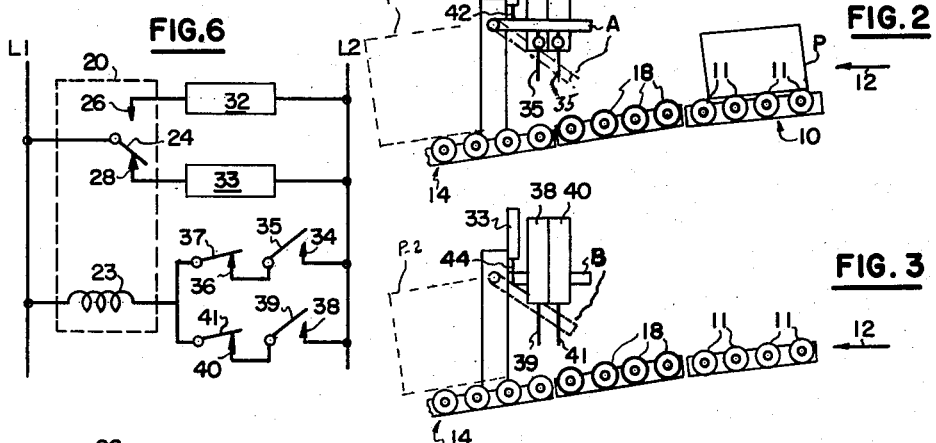
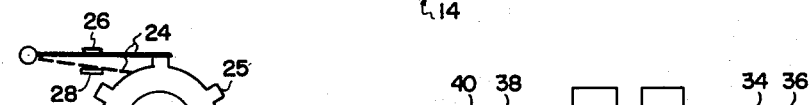
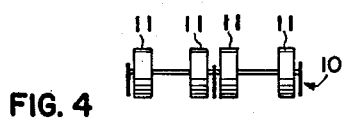
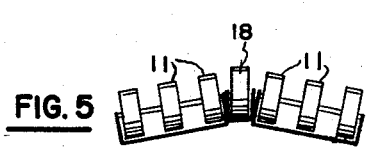
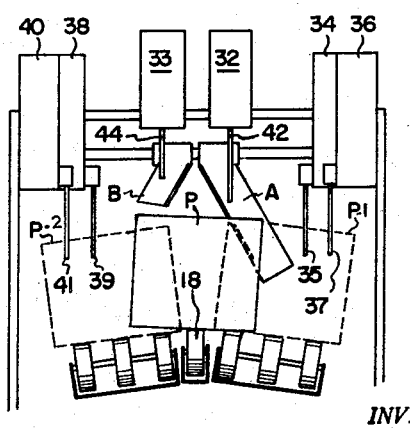
INVENTOR.
JAMES L. LAYTON, JR.
BY
ATTORNEY

United States Patent Office 3,115,961
Patented Dec. 31, 1963

3,115,961
SORTING AND DISTRIBUTING DEVICE
James L. Layton, Jr., 23 Snowden Road, Bala Cynwyd, Pa.
Filed May 19, 1961, Ser. No. 111,352
9 Claims. (Cl. 193—36)

This invention relates to a conveyor and more particularly, to a conveyor which is adapted to receive objects such as cans, bottles, packages, and the like, in one stream and to divide and channel said objects into two streams with the same number of objects in each stream.

One object of the invention is to produce an improved conveyor of the type set forth.

A further object is to produce an improved conveyor which operates at high speed and which is inexpensive to produce and simple to operate.

A still further object is to produce a conveyor of the type set forth which can easily be incorporated in, or which can be appended to, a production line without any interference with any other apparatus forming part of said line.

Broadly stated, a conveyor embodying this invention includes a main conveyor adapted to receive objects in a single stream, a pair of diverging branch conveyors connected, in object-receiving relation to said main conveyor, and means located near the junction of said main and branch conveyors for diverting objects arriving on said main conveyor onto either of said branch conveyors.

The full nature of the invention will be understood from the following specification and the accompanying drawings in which:

FIG. 1 is a diagrammatic top plan view of a conveyor embodying the invention, certain parts being omitted.

FIG. 2 is a sectional view looking in the direction of line 2—2 on FIG. 1 showing the parts in one position thereof.

FIG. 3 is a sectional view looking in the direction of line 3—3 on FIG. 2 showing the parts in the other position thereof.

FIG. 4 is a sectional view looking in the direction of line 4—4 on FIG. 1.

FIG. 5 is a sectional view looking in the direction of line 5—5 on FIG. 1.

FIG. 6 is a diagrammatic view of the control mechanism.

FIG. 7 is a fragmentary view diagrammatically illustrating the principle of operation of a conventional sequence switch which forms part of the control mechanism shown in FIG. 6.

FIG. 8 is an enlarged, diagrammatic view looking in the direction of line 8—8 on FIG. 1.

As best illustrated in FIG. 1, the apparatus includes a sloped, main conveyor 10 which is adapted to receive objects, such as packages P, from a source, not shown, and to propel them, single file, and in a single stream, in the direction of arrow 12. Conveyor 10 is connected, in flow relation with the converging, receiving ends of branch conveyors 14 and 16, which are adapted to convey objects P to a destination, not shown. Conveyors 10, 14 and 16 may be made of freely rotating rollers 11, as shown, or they may be provided with moving belts, or with fixed, smooth surfaces on which objects can slide, by gravity, in the direction of arrow 12. According to my invention, it is only necessary that a high ridge 18 be provided between the receiving ends of conveyors 14 and 16 so that as each object leaves the end of conveyor 10, it "teeters" on said ridge so that, on falling to one side or the other, it will travel down one, or the other, of conveyors 14 and 16. In the preferred embodiment, center ridge 18 is formed by one, or more, rows of rolls 18 which are rotatable about individual, fixed horizontal axes so as to present a permanently oriented supporting surface which is higher than the supporting surfaces of rollers 11. As shown in FIG. 5, the surfaces of the rolls of ridge 18 are horizontal while the surfaces of rolls 11 on either side thereof slope in opposite direction.

A conveyor constructed as above described will operate, but the number of objects arriving on conveyor 10 may, or may not, be evenly divided between conveyors 14 and 16 and objects falling haphazardly off rolls 18 may jam together at the receiving ends of branch conveyors 14 and 16.

In order to expedite, and insure uninterrupted, operation and to insure controlled, equal, or unequal, distribution of the objects arriving on conveyor 10 between conveyors 14 and 16, I provide the control mechanism which is shown in FIG. 6 and which, being made of conventional components, is only very diagrammatically illustrated in FIG. 6.

The control mechanism illustrated includes a conventional single pole, two position, sequence switch 20, which is adapted to be intermittently energized alternately to activate solenoids, or the like, for controllably diverting the packages arriving on conveyor 10 onto conveyors 14 and 16. Although the switch used is conventional and is disclosed on page 24 of catalog No. K. S–D of Struthers-Dunn, of Pitman, New Jersey, its operation is, for convenience diagrammatically illustrated in FIG. 7, from which it will be seen that the sequence switch includes a gear 22 and a relay coil 23 which, when energized, rotates gear 22, one notch at a time, to cause switch arm 24 successively to engage contact 26 or contact 28. The pawl and dog which co-act with the relay and other details of structure have been omitted because they are well known and form no part of the present invention. It is enough to say that successive energization of relay 23 alternately completes the circuit through contacts 26 and 28.

Contact 26 is connected in series with solenoid 32; contact 28 is connected in series with solenoid 33, and coil 23 is connected in series with a first set of switches 34 and 36 and with a second set of switches 38 and 40. As will be seen from FIGS. 1, 2, 3 and 8, switches 34 and 36 are located above the entrance to branch conveyor 14 so that their respective pendent switch arms 35 and 37 will be in the path of movement of a package P which has been diverted, as hereinafter explained, from main conveyor 10 to branch conveyor 14. Switches 38 and 40 are located above the entrance to branch conveyor 16 so that their respective pendent arms 39 and 41 will be in the path of movement of a package P which has been diverted from main conveyor 10 to branch conveyor 16. It will also be seen that solenoid 32 is disposed above the entrance to branch conveyor 14 and that its armature 42 is secured to a substantially horizontally disposed arm A, which is pivoted at 43, and that solenoid 33 is disposed above the entrance to branch conveyor 16 and that its armature 44 which is secured to a substantially horizontally disposed arm B, which is pivoted at 45.

The operation is as follows:

With the parts in the position of FIG. 6, solenoid 33 is energized and therefore arm B is raised to the solid line position of FIG. 3. Conversely, solenoid 32 is de-energized and therefore arm A will drop, by gravity, to the broken line position of FIG. 2, where it will be in the path of movement of a package P approaching the entrance of conveyor 14. It will be remembered that as a package leaves main conveyor 10, it rides on elevated rollers 18 and teeters to the right or to the left, as viewed in FIG. 8. It will also be seen that either arm A, which is controlled by solenoid 32, or arm B, which is controlled by solenoid 33, will be in its lower position, depending on the position of switch 24. As shown in FIG. 8, arm A is in its lower position, or in the path of movement of a package P, and arm B is in its upper position, or out of the way of such package. It will also be seen from FIGS. 1 and 8 that arms A and B converge, whereby the movement of a package engaging the surface of arm A will tilt the package onto the rollers 11 of conveyor 16 which will carry the package to position P–2 in FIG. 8 and whereby movement of a package engaging the surface of arm B will tilt the package onto rollers 11 of conveyor 14, which will carry the package to position P–1. But, as the package moves toward position P–2 in FIG. 3, it engages switch arm 39 and closes normally open switch 38 to energize relay coil 23. Energization of relay coil 23 moves switch arm 24 into engagement with contact 26 to de-energize solenoid 33 and to energize solenoid 32. This causes solenoid 32 to raise arm A to the solid line position of FIG. 2 and allows arm B to drop, by gravity, to the broken line position of FIG. 3 to reverse the previously prevailing relationship of the parts. Further movement of the package toward position P–2 causes it to engage switch arm 41 and open normally closed switch 40 to de-energize relay coil 23. It will be noted that arm B drops while a package is passing through the entrance to conveyor 16 and will rest lightly on the top of such package until the package has cleared the arm. This permits the arm to guide and stabilize the package. The next package leaving the main conveyor 10 is engaged by the surface of lowered arm B and will be tilted toward branch conveyor 14, or toward position P–1, as shown in FIG. 8. This package will now be carried away by conveyor 14 in the manner described in connection with conveyor 16, and movement of the package toward position P–1 causes it to trip switch arm 35, close switch 34 to energize relay coil 23 and return switch arm 26 into engagement with contact 28 to restore the parts to the condition prevailing before the cycle described began. Further movement of the package toward position P–1 causes it to trip switch arm 37 to open switch 36 and de-energize relay coil 23 until switch 38 is again closed, and so on.

In addition to guiding and stabilizing the package therebeneath, the early downward movement of arm B (and the same is true of arm A) accelerates the arrival of arm B at its lower position where it will be ready to deflect the next package to position P–1. In other words, by dropping arm B while a first package is moving under it, the arm will drop to its lower position immediately upon passage of the package therebelow, which is much faster than it would if solenoid 33 were not energized until the package has completed its passage beneath the solenoid. This feature is partly responsible for the very high speed at which the machine can be operated.

From the foregoing, it will be seen that as soon as a package is tilted, by arm A, or by arm B, the package will be positively propelled in the direction of position P–1 or P–2 by the rolls, by moving belts, or by gravity, and that switch arm 35 or 39 will be tripped by the package to close switch 34 or 38 to de-energize the solenoid under which the package is moving and to energize the solenoid above the opposite conveyor. This insures reciprocation of arms A and B so that they will alternately tilt successive packages onto the receiving ends of conveyors 14 and 16. It will be noted that the opening of switch 36 or switch 40 by one package de-activates the relay while said package is completing its passage, thus permitting the succeeding package to follow the preceding package very closely. This greatly expedites the operation and, in actual practice, a machine built in the manner described is capable of sustained operation at the rate of 350 packages a minute, each package being large enough to contain six cans or bottles of beer, or any package of comparable dimensions.

What I claim is:

1. A package distributing machine for forming two streams out of an initially single stream of packages with controlled numbers of packages being diverted to each stream, said machine including a main conveyor for receiving the packages to be distributed and moving them in single file and in a single stream, first and second branch conveyors having package receiving ends converging towards, and merging with, the discharge end of said main conveyor, an elevated permanently oriented ridge between said receiving ends and on which all packages leaving said main conveyor must ride, a first control means associated with said first branch conveyor and operable by contact with a first package moving over said first branch conveyor, to tilt said package toward said second branch conveyor, and a second control means associated with said second conveyor and operable by contact with a second package moving on said second branch conveyor to tilt said second package toward said first branch conveyor.

2. The machine defined in claim 1 and means for automatically selectively activating either of said control means.

3. The machine defined in claim 1 in which said control means are electrically operated and switch means associated with at least one of said branch conveyors for selectively activating and de-activating either of said control means in a predetermined order.

4. A package distributing machine including a main conveyor for receiving packages and moving them in single file and in a single stream, first and second branch conveyors having package receiving ends converging toward and merging with the delivery end of said main conveyor, a row of elevated rollers disposed between the receiving ends of said branch conveyors at their junction with said main conveyor and on which packages leaving said main conveyor must ride, said rollers being freely rotatable about fixed horizontal axes, a first arm movable to a first position in which it is in the path of movement of a first package moving on said rollers toward said first branch conveyor and to a second position in which said arm is out of the path of movement of said first package, a second arm movable to a first position in which it is in the path of movement of a second package moving on said rollers toward said second conveyor and to a second position in which said arm is out of the path of movement of said second package, said first arm being slanted from near one edge, toward the center, of said first conveyor so that, in its first position, said first arm will tilt a package moving in engagement therewith toward said second branch conveyor, and said second arm being slanted from the opposite edge toward the center, of said conveyor, so that in its first position said second arm will tilt a package moving in engagement therewith toward said first branch conveyor, and actuating means for controllably moving said arms to their respective second positions.

5. A package distributing machine including a main conveyor for receiving packages and moving them in single file and in a single stream, first and second branch conveyors having package receiving ends converging toward, and merging with, the delivery end of said main conveyor, an elevated track disposed between the receiving ends of said branch conveyors at their junction with said main conveyor and on which packages leaving said main conveyor must ride, a first arm movable to a first position in which it is in the path of movement of a first package moving toward said first branch conveyor and to a second position in which said arm is out of the path of movement of said first package, a second arm movable to a first position in which it is in the path of movement of a second package moving toward said second conveyor and to a second position in which said arm is out of the path of movement of said second package, each of said arms being so constructed and arranged that, in its first position, said first arm tilts said first package toward said second branch conveyor and so that in its first position said second arm tilts said second package toward said first branch conveyor, and actuating means for controllably moving said arms to their respective second positions.

6. The machine defined in claim 5 in which said arms are located above said branch conveyors, respectively, and move to their respective first positions by gravity.

7. The machine defined in claim 5 in which said actuating means include a first solenoid associated with said first arm and a second solenoid associated with said second arm.

8. The machine defined in claim 5 in which said arms are located above said branch conveyors, respectively, and in which said actuating means includes a first solenoid associated with said first arm, a second solenoid associated with said second arm, together with a first switch means operable by the movement of said first package toward said first conveyor to energize said first solenoid and to de-energize said second solenoid, and second switch means operable by movement of said second package toward said second branch conveyor for energizing said second solenoid and de-energizing said first solenoid.

9. The machine defined in claim 8 in which said first and second switch means are so timed that said first switch means de-energizes said second solenoid to permit said second arm to move to its first position while said second package is still moving under said second arm, and said second switch means de-energizes said first solenoid to permit said first arm to move toward its first position while said first package is still moving under said first arm, whereby said arms engage the tops of the respective packages during a portion of the movement of said packages between said main and said branch conveyors.

References Cited in the file of this patent

UNITED STATES PATENTS

| | | |
|---|---|---|
| 2,115,620 | Cave | Apr. 26, 1938 |
| 2,278,544 | Gaskill | Apr. 7, 1942 |
| 2,566,417 | Holm | Sept. 4, 1951 |
| 2,860,762 | Alexander | Nov. 18, 1958 |
| 2,873,836 | Stubblefield | Feb. 17, 1959 |